A. C. HIGGINS.
METHOD OF TREATING ALUMINOUS MATERIALS AND PRODUCTS THEREOF.
APPLICATION FILED MAR. 20, 1906. RENEWED MAY 29, 1908.
916,866.
Patented Mar. 30, 1909.
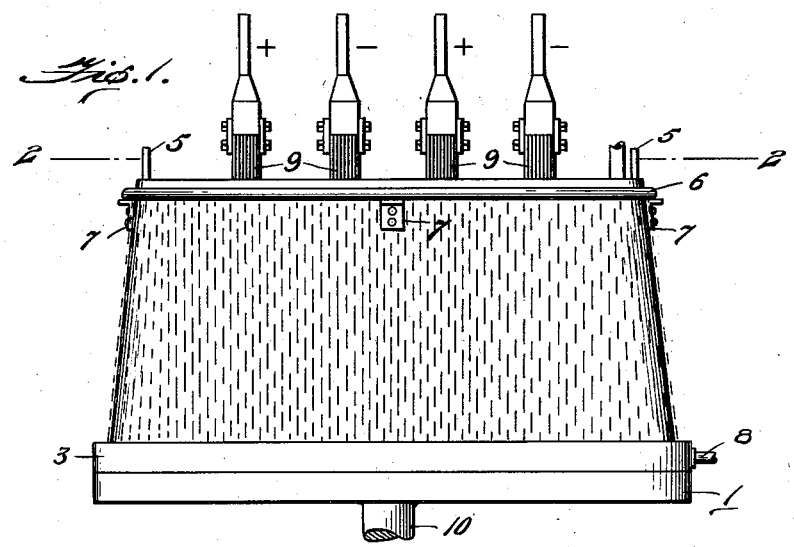
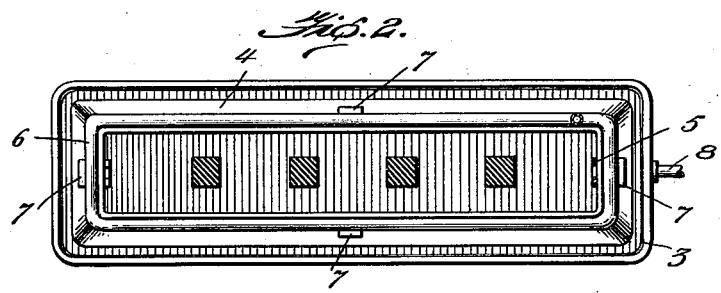
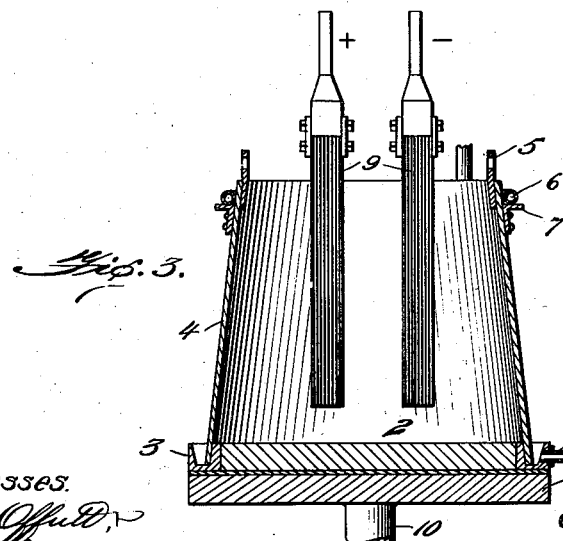

UNITED STATES PATENT OFFICE.

ALDUS C. HIGGINS, OF WORCESTER, MASSACHUSETTS.

METHOD OF TREATING ALUMINOUS MATERIALS AND PRODUCTS THEREOF.

No. 916,866.            Specification of Letters Patent.      Patented March 30, 1909.

Application filed March 20, 1906, Serial No. 307,090. Renewed May 29, 1908. Serial No. 435,691.

*To all whom it may concern:*

Be it known that I, ALDUS C. HIGGINS, a citizen of the United States, residing at Worcester, in the county of Worcester and State of Massachusetts, have invented certain new and useful Improvements in Methods of Treating Aluminous Materials and Products Thereof, of which the following is a specification.

The object of this invention is to prepare an abrasive by the fusion of an aluminous material, as, for instance, an anhydrous or hydrated oxid of aluminum, and the subsequent cooling or chilling of the product into a pig or mass of exceptional toughness and great hardness.

For a full understanding of my invention reference is made to the accompanying drawing showing several forms of furnace suitable for carrying my method into effect.

Figure 1 is a side elevation of a preferred form of furnace; Fig. 2 is a horizontal section of the same on line 2—2 of Fig. 1; Fig. 3 is a central vertical section of a modified form of furnace.

The form of furnace herein shown comprises a movable hearth 1 having a refractory bed or lining 2 preferably of carbon, surrounded by a metallic trough or base-ring 3 which serves to collect the water used for cooling or chilling the product as hereafter described. The shell or furnace casing 4 may be constructed of boiler plate or sheet-iron, and is separable from the hearth, lugs 5 being provided for lifting it therefrom. The shell is preferably inwardly inclined toward its upper end as shown. Cooling or chilling of the product is effected by water supplied through perforated pipes 6 surrounding the upper portion of the shell and supported thereon by lugs 7; the perforations in pipe 6 are arranged to direct the water against the shell 4 in such manner that it flows down the inclined surface thereof in an unconfined stream or film, to be collected by the base-ring 3 and discharged through a suitable waste pipe 8.

The furnace shown is of the arc type, having stationary electrodes 9 depending into the casing in position to heat the charge or material therein. The method is the same in the case of both of the furnaces shown and is as follows: The aluminous material is continuously or intermittently fed to the crucible and is fused therein by the heat of the arc or arcs, the crucible being in the meantime gradually lowered, as, for instance, by means of a direct plunger hydraulic elevator, the plunger of which is shown at 10. During this operation water is discharged through the perforated pipes against the shell or casing 4 in such manner as to cool or chill the molten mass in the crucible and to provide conditions under which the said mass solidifies into an exceptionally tough and very hard pig, suitable for use in the manufacture of abrasives, and for other purposes. I have discovered that such chilling or cooling as is here indicated is necessary in order to secure the most satisfactory product, and that the product so obtained is distinctly different from and superior to that produced by permitting the mass to cool slowly during the descent of the crucible, the chilling or cooling of the mass conferring upon it increased toughness, the term toughness being here used to indicate resistance to crushing. The water serves moreover to protect the shell 4 against injury by overheating, the solidified product protecting the shell from the highly heated or fused mass in the vicinity of the arc, as set forth in my prior patent No. 775,654, issued November 22, 1904.

At the end of the run the shell is lifted off and the pig or solidified product can be moved from the hearth by a suitable hoist, the furnace being immediately assembled and placed in operation.

My method can be carried into effect in furnaces of other types than those shown, the essential feature of the method being that the fused mass should be cooled or chilled into a tough pig or mass. I prefer to construct the furnace in the form of a relatively long and narrow chamber as indicated in Figs. 1 and 2, a number of electrodes 9 being provided proportionate to the length of the chamber. As will be readily understood the cooling or chilling effect of the water upon the product when, as is usually preferred, it is permitted to solidify in the furnace, is more nearly uniform in a furnace of this form than in the case of a round hearth as shown in Fig. 3 or in my prior patent above referred to, particularly if the round furnace is of large dimensions; a product of satisfactory character may be obtained, however, in a furnace of this construction.

I claim:

1. The method of making a material suitable for use as an abrasive, which consists in fusing an aluminous material, chilling the fused product in the furnace into a pig or mass, and crushing the mass.

2. The method of making a material suitable for use as an abrasive, which consists in fusing an oxid of aluminum, chilling the fused product in the furnace into a pig or mass, and crushing the mass.

3. The method of making a material suitable for use as an abrasive, which consists in fusing an aluminous material, chilling the fused product in the furnace into a pig or mass of practically uniform character throughout, and crushing the mass.

4. As a new article of manufacture, a material suitable for use as an abrasive, produced by fusing an aluminous material and chilling the fused product in the furnace into a pig or mass, the said material characterized by its abrasive properties and by the superior toughness conferred by chilling as distinguished from slow cooling, substantially as described.

5. As a new article of manufacture, a pig or mass of practically uniform character and suitable for use in the preparation of an abrasive, produced by fusing an aluminous material and chilling the fused product in the furnace into a pig or mass, the said material characterized by its abrasive properties and by the superior toughness conferred by chilling as distinguished from slow cooling, substantially as described.

In testimony whereof, I affix my signature in presence of two witnesses.

ALDUS C. HIGGINS.

Witnesses:
EUGENE A. BYRNES,
J. B. HILL.